United States Patent
Wu et al.

(10) Patent No.: US 11,919,192 B2
(45) Date of Patent: Mar. 5, 2024

(54) BAMBOO CHIP INTEGRATED MATERIAL AND MANUFACTURING METHOD THEREOF

(71) Applicant: HUNAN TAOHUAJIANG BAMBOO SCIENCE & TECHNOLOGY CO., LTD., Hunan (CN)

(72) Inventors: Zhiping Wu, Hunan (CN); Jinbo Hu, Hunan (CN); Yanhui Xiong, Hunan (CN); Zhicheng Xue, Hunan (CN); Ting Li, Hunan (CN); Zhibin Hu, Hunan (CN); Yuankun Hu, Hunan (CN)

(73) Assignee: HUNAN TAOHUAJIANG BAMBOO SCIENCE & TECHNOLOGY CO., LTD., Hunan (CN)

( * ) Notice: Subject to any disclaimer, the term of this patent is extended or adjusted under 35 U.S.C. 154(b) by 685 days.

(21) Appl. No.: 17/043,696

(22) PCT Filed: Apr. 18, 2019

(86) PCT No.: PCT/CN2019/083252
§ 371 (c)(1),
(2) Date: Sep. 30, 2020

(87) PCT Pub. No.: WO2020/181614
PCT Pub. Date: Sep. 17, 2020

(65) Prior Publication Data
US 2021/0060815 A1    Mar. 4, 2021

(30) Foreign Application Priority Data
Mar. 14, 2019 (CN) .......................... 201910195046.6

(51) Int. Cl.
*B27D 1/04* (2006.01)
*B27D 1/10* (2006.01)
(Continued)

(52) U.S. Cl.
CPC .................. *B27N 3/02* (2013.01); *B27D 1/04* (2013.01); *B27D 1/10* (2013.01); *B27N 3/203* (2013.01);
(Continued)

(58) Field of Classification Search
CPC .................................... B27D 1/10; B27D 1/04
(Continued)

(56) References Cited

U.S. PATENT DOCUMENTS

| 3,378,430 A | * | 4/1968 | Aizawa | ..................... B27D 1/10 100/311 |
| 2005/0161116 A1 | | 7/2005 | Chang | |

(Continued)

FOREIGN PATENT DOCUMENTS

| CN | 1891419 | 1/2007 |
| CN | 101891047 | 4/2013 |

(Continued)

OTHER PUBLICATIONS

English Translation of CN2033293316 (Year: 2013).*
(Continued)

*Primary Examiner* — Scott W Dodds
(74) *Attorney, Agent, or Firm* — JCIP GLOBAL INC.

(57) ABSTRACT

The invention discloses a bamboo chip integrated material. The bamboo chip integrated material is formed by a plurality of lengthened bamboo chips which are glued and overlaid; each lengthened bamboo chip is formed by a plurality of bamboo chip units which sequentially and continuously mesh and are butted; sharp teeth and grooves are formed in the two ends in the length direction of the bamboo chip units, wherein the sharp tooth of each bamboo chip unit and the groove of the corresponding bamboo sheet unit are matched to form a meshing butt-joint part, and the meshing butt-joint parts of the adjacent lengthened bamboo chips are arranged (Continued)

in a staggered mode; and each bamboo chip unit has a thickness of 4-12 mm and a width of 15-50 mm.

6 Claims, 4 Drawing Sheets

(51) Int. Cl.
  *B27N 3/02* (2006.01)
  *B27N 3/20* (2006.01)
  *B62D 25/20* (2006.01)
  *B62D 29/02* (2006.01)
  *B32B 37/12* (2006.01)

(52) U.S. Cl.
  CPC ............ *B62D 25/20* (2013.01); *B62D 29/02* (2013.01); *B32B 37/12* (2013.01)

(58) Field of Classification Search
  USPC ...................................... 156/304.5
  See application file for complete search history.

(56) References Cited

U.S. PATENT DOCUMENTS

| | | | |
|---|---|---|---|
| 2010/0151175 A1 | 6/2010 | Gao et al. | |
| 2011/0274872 A1* | 11/2011 | Yu | ............................ B32B 21/14 144/333 |

FOREIGN PATENT DOCUMENTS

| | | | |
|---|---|---|---|
| CN | 203293316 U | * | 11/2013 |
| CN | 103753659 | | 4/2014 |
| CN | 105773738 | | 7/2016 |
| CN | 107263626 | | 10/2017 |
| CN | 107486895 | | 12/2017 |
| CN | 206913353 | | 1/2018 |
| CN | 108145808 | | 6/2018 |
| CN | 108714946 | | 10/2018 |

OTHER PUBLICATIONS

Machine translation of Nie (CN1891419) (Note original foreign document was filed into prosecution history on Sep. 30, 2020) (Year: 2007).*

Machine translation of Dai et al. (CN101891047) (Note original foreign document was filed into prosecution history on Jun. 30, 2023) (Year: 2010).*

Machine translation of Lai (CN107486895) (Note original foreign document was filed into prosecution history on Jun. 30, 2023) (Year: 2017).*

Machine translation of Zeng et al. (CN103753659) (Note original foreign document was filed into prosecution history on Sep. 30, 2020) (Year: 2104).*

"International Search Report (Form PCT/ISA/210) of PCT/CN2019/083252," dated Dec. 19, 2019, pp. 1-5.

"Search Report of Europe Counterpart Application", dated Nov. 15, 2022, p. 1-p. 8.

* cited by examiner

BAMBOO CHIP INTEGRATED MATERIAL AND MANUFACTURING METHOD THEREOF

CROSS-REFERENCE TO RELATED APPLICATION

This application is a 371 of international application of PCT application serial no. PCT/CN2019/083252, filed on Apr. 18, 2019, which claims the priority benefit of China application no. 201910195046.6, filed on Mar. 14, 2019. The entirety of each of the above mentioned patent applications is hereby incorporated by reference herein and made a part of this specification.

BACKGROUND

Technical Field

The present invention relates to the technical field of bio-composites for van trucks, in particular to an infinite-arbitrary-length bamboo chip integrated material and manufacturing method thereof.

Description of Related Art

At present, the van truck bottom plates are mainly made of hardwood around the globe, such as apitong in hylaea or broad-leaved hardwood in frigid zone. However, with the rapid development of the global transport industry, the hardwood with long growth cycle cannot conform to the demand of the van truck bottom plates. Meanwhile, with fewer hardwood resources, the hardwood resources are scarce and expensive and the logistic cost increases. For this reason, searching the hardwood substitutes to manufacture the van truck bottom plates has become an urgent need of the times.

Bamboo, as an abundant renewable resource, has such advantages as fast growth speed, high yield and good wood substitute. As one of the best raw materials of the structural materials among plants, it features high strength, good elasticity, stable performance and low density. With higher specific strength and specific stiffness than woods and normal steel, the bamboo has been extensively applied to constructional engineering and structural materials. Hence, the bamboo is ideal to manufacture the van truck bottom plates.

Differing from the trees, a new technical innovation is needed to produce bamboos similar to the woods with the bamboos having the completely different form from the trees. Due to the fact that the ecological and raw bamboos are round and hollow, how to fully utilize bamboo walls is considered during the processing of the modern bamboo industry. Moreover, the bamboos have small and thin tails and large and thick heads, but the bamboo chips are processed to cuboid bamboo chip units with equal width and thickness when the bamboo plates are produced. Hence, the thick ends are processed as thin as the thin ends, the narrow ends are processed as narrow as the narrow ends, and the rest are planed off. This determines that the lengths of the processed bamboo plates are limited, namely the longer the bamboo, the lower the use ratio and the higher the raw material cost. Most bamboo timbers produced based on the natural lengths of the bamboo chips are within 2 m in the market. However, there is a high demand to produce furniture and decorations for over 3 m long bamboo plates in the market, even to produce the van truck bottom plates and building beams and columns for over 10 m bamboos. But this difficult problem has not been solved by the good production technology. A finger joint plate method was tried to realize the lengthening of a certain length. Finger-jointed equipment cannot directly lengthen the bamboo chips, but needs to process the bamboo chips into larger cuboids, and then conducts finger-joint lengthening by means of pressing the both ends. This production technology mode has many defects: firstly, the cost is high; secondly, there are obvious connectors; thirdly, the length is still limited, and cannot be infinite; fourthly, the serious color difference is unavoidable; fifthly, the connector is large, and the mechanical strength of the plate surface is uniform. For this, we are committed to solving this problem with the better technical methods.

SUMMARY

The technical problem to be solved by the present invention is to overcome the shortages of the prior art. The present invention provides an infinite-arbitrary-length bamboo chip integrated material and manufacturing method thereof, wherein the integrated material has small connectors and uniform mechanical strength, and is applicable to such structural materials as van truck bottom plates.

To solve the above technical problem, the present invention applies the following technical solution:

An infinite-arbitrary-length bamboo chip integrated material. The bamboo chip integrated material is formed by a plurality of lengthened bamboo chips which are glued and overlaid; each lengthened bamboo chip is formed by a plurality of bamboo chip units which sequentially and continuously mesh and are butted; sharp teeth and grooves are formed in the two ends in the length direction of the bamboo chip units, wherein the sharp tooth of each bamboo chip unit and the groove of the corresponding bamboo sheet unit are matched to form a meshing butt-joint part, and the meshing butt-joint parts of the adjacent lengthened bamboo chips are arranged in a staggered mode; and each bamboo chip unit has a thickness of 4-12 mm and a width of 15-50 mm.

As a further improvement for the above technical solution:

The sharp teeth include large teeth and a row of a plurality of small teeth, the large teeth are thicker than the small teeth, the large teeth are arranged adjacent to one side edges of the bamboo chip units, and the plurality of small teeth extend to another side edges of the bamboo chip units. The grooves include large slots and small slots respectively matching the large teeth and the small teeth.

Each groove has a length of 5-20 mm, and a bottom width of 1-8 mm.

Each lengthened bamboo chip has a length of 10-30 m.

A spacing S, between the meshing butt-joint parts of the adjacent lengthened bamboo chips arranged in a staggered mode, is more than or equal to 5 cm.

The surfaces of the bamboo chips are provided with notches.

The notches are of a punctiform shape, with a depth of 0.1-1 mm, a diameter of 0.2-2 mm, and a density of 1-3 notches/cm$^2$.

The plurality of bamboo chip integrated materials are glued to form the widened or thickened bamboo chip integrated materials in a width direction or a thickness direction. The bamboo chip units between the adjacent bamboo chip integrated materials are arranged in a staggered mode.

As a general inventive concept, the present invention further provides a manufacturing method of the infinite-arbitrary-length bamboo chip integrated material, comprising the following steps:

S1. processing bamboos into bamboo chip units, providing sharp teeth and grooves at both ends of each bamboo chip unit, continuously meshing and butting the plurality of bamboo chip units, and cutting off the bamboo chip units that reach a preset length to obtain lengthened bamboo chips according to needs;

S2. taking the plurality of lengthened bamboo chips obtained in step S1, conducting vertical assembly processing in a thickness direction of the lengthened bamboo chips after the surface of each lengthened bamboo chip is glued with the adhesive, and providing the meshing butt-joint parts of the adjacent lengthened bamboo chips in a staggered mode to obtain blank plates;

S3. placing the blank plates obtained in Step S2 in a hot press with positive and lateral pressing functions for positive and lateral hot pressing and gluing treatment to obtain the bamboo chip integrated materials;

when the adhesive is made of urea resin, the hot pressing and gluing treatment temperature is 90-100° C.;

when the adhesive is made of phenolic resin, the hot pressing and gluing treatment temperature is 130-140° C.;

for the hot pressing and gluing treatment, a positive pressure is 0.1-0.5 MPa, and a lateral pressure is 0.3-3.0 MPa.

As a further improvement for the above technical solution:

In the step S3, the hot pressing and gluing treatment further includes the following steps: planning the plurality of bamboo chip integrated materials subject to hot pressing and gluing, placing into a cold press for cold pressing and gluing treatment after the surfaces thereof are coated with a cold-cured adhesive, so as to obtain the widened or thickened bamboo chip integrated materials.

The cold-cured adhesive is made of one of resorcinol formaldehyde resin, modified resorcinol-formaldehyde resin or isocyanate; when the cold pressing and gluing treatment is conducted, the temperature is room temperature, the positive pressure is 0.2-2 MPa, and the lateral pressure is 0.3-2.0 MPa.

In the step S1, processing the bamboos into the bamboo chip units by virtue of cut saw, dissection, initial milling, drying and finish milling;

in the step S1, roller meshed butting equipment is applied for continuous meshing and butting and includes horizontal grooves and a plurality of rows of rollers, the horizontal grooves are used for placing the bamboo chip units, an inner width of each horizontal groove matches a width of the corresponding bamboo chip unit and a width of each horizontal groove is adjustable, and the rollers are arranged over the horizontal grooves to contact the bamboo chip units and drive the bamboo chip units to be conveyed forwards.

The continuous meshing and butting includes the following specific steps: placing the bamboo chip units into the horizontal grooves sequentially, wherein the sharp teeth of the bamboo chip units and the grooves of the adjacent bamboo chip units are arranged relatively; adjusting the revolving speed of the rollers over the bamboo chip unit so that the sharp teeth of the bamboo chip units continuously mesh and are butted with the grooves of another bamboo chip unit in a bamboo chip unit conveying direction when a revolving speed $n_1$ of the rollers over the front bamboo chip unit is lower than a revolving speed $n_2$ of the rollers above the rear bamboo chip unit and a conveying speed $v_1$ of the front bamboo chip unit is lower than a conveying speed $v_2$ of the rear bamboo chip unit.

In the step S2, the surfaces of the lengthened bamboo chips are notched before the adhesive is coated; the notching equipment is thorn rollers with thorns on the roller surfaces.

Compared with the prior art, the present invention has the following advantages:

(1) For the infinite-arbitrary-length bamboo chip integrated material and manufacturing method thereof provided by the present invention, the plurality of bamboo chip units mesh and are butted for lengthening to realize the production of long bamboo plates with short bamboo chips with a thickness of 4-12 mm and a width of 15-50 mm, thereby greatly improving the bamboo use ratio, reducing the raw material costs of the bamboo material products, improving the bamboo market share, providing the strong technical support for using the bamboo to replace and surpass the woods, simplifying the complicated problems, making the production of bamboo products with various sizes and specifications efficiently come true, and ensuring the quality.

(2) For the infinite-arbitrary-length bamboo chip integrated material and manufacturing method thereof provided by the present invention, the meshing butt-joint parts of the adjacent lengthened bamboo chips are arranged in a staggered mode, so that the mechanical strengths of all parts on the blank plate surfaces are equal and uniform; moreover, the meshing butting parts of the surfaces are not obvious to avoid the bright color difference and realize attractive surfaces, thereby breaking through the original bamboo product limits, greatly expanding the application fields of the bamboo products as the environment-friendly material, and particularly being applicable to such structural materials as van truck bottom plates.

(3) For the manufacturing method of the infinite-arbitrary-length bamboo chip integrated material provided by the present invention, the stress of the integrated materials is homogeneous and not deformed during the subsequent processing and use when the hot pressing and gluing is conducted by positive and lateral pressing.

(4) For the manufacturing method of the infinite-arbitrary-length bamboo chip integrated material provided by the present invention, when a thickness value of a target bamboo chip integrated material is more than that of single bamboo chip integrated material (for instance, the thickness value of target bamboo chip integrated material is 64 mm and a width value of single bamboo chip integrated material is 50 mm in Embodiment 1), the bamboo chip integrated materials is an extra-thick plate, which needs further cold pressing and gluing treatment after hot-pressing and gluing; while energy consumption is reduced, the large plates can glued at room temperature, so the technical bottleneck of being difficult to transfer heat when the large plates are glued with the phenolic resin is solved.

(5) For the infinite-arbitrary-length bamboo chip integrated material and manufacturing method thereof provided by the present invention, the notches increase the surface roughness and pore structure of each bamboo chip unit, thereby improving the gluing strength of the lengthened bamboo chips.

DESCRIPTION OF THE EMBODIMENTS

Figure 1:
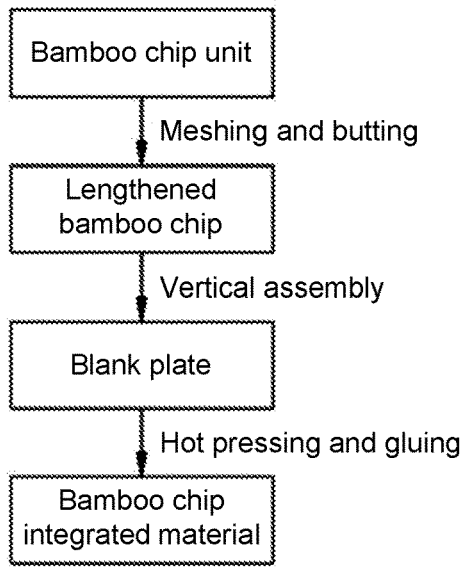
FIG. 1 illustrates a process flow of the present invention.

The present invention will be further elaborated based on the drawings and embodiments. Unless stated otherwise, the following materials or instruments are commercially available.

The present invention discloses an infinite-arbitrary-length bamboo chip integrated material. The infinite-arbitrary-length bamboo chip integrated material is formed by a plurality of lengthened bamboo chips which are glued and overlaid; each lengthened bamboo chip is formed by a plurality of bamboo chip units 3 which continuously mesh and are butted in sequence; sharp teeth 31 and grooves 32 are formed in the two ends in the length direction of the bamboo chip units 3, wherein the sharp tooth 31 of each bamboo chip unit 3 and the groove 32 of the corresponding bamboo sheet unit 3 are matched to form a meshing butt-joint part, and the meshing butt-joint parts of the adjacent lengthened bamboo chips are arranged in a staggered mode; and each bamboo chip unit 3 has a thickness of 4-12 mm and a width 15-50 mm.

The sharp teeth 31 include large teeth 311 and a row of a plurality of small teeth 312, the large teeth 311 are thicker than the small teeth 312, the large teeth 311 are arranged adjacent to one side edge of the bamboo chip units 3, and the plurality of small teeth 312 extend to another side edges of the bamboo chip units 3. The grooves 32 include large slots 321 and small slots 322 respectively matching the large teeth 311 and the small teeth 312. The large teeth 311 are thicker than the small teeth 312. Hence, the breaking risk of the sharp teeth 31 and the rejection rate of the bamboo chip units 3 are lowered when the meshing strength is ensured.

Each groove 32 has a length of 5-20 mm and a bottom width of 1-8 mm. The lengthened bamboo chip has a length of 10-30 m. A spacing S, between the meshing butt-joint parts of the adjacent lengthened bamboo chips arranged in a staggered mode, is more than or equal to 5 cm.

The plurality of bamboo chip integrated materials are glued to form the widened or thickened bamboo chip integrated materials in a width direction or a thickness direction. The bamboo chip units 3 between the adjacent bamboo chip integrated materials are arranged in a staggered mode.

As shown in FIG. 1, the present invention provides a manufacturing method of an infinite-arbitrary-length bamboo chip integrated material, comprising the following steps:

S1. processing bamboos into bamboo chip units 3, providing sharp teeth 31 and grooves 32 at both ends of each bamboo chip unit 3, continuously meshing and butting a plurality of bamboo chip units 3, and cutting off the bamboo chip units 3 that reach a preset length to obtain lengthened bamboo chips according to the needs;

S2. taking the plurality of lengthened bamboo chips obtained in step S1, conducting vertical assembly processing in a thickness direction of the lengthened bamboo chips after the surface of each lengthened bamboo chip is glued with the adhesive, and providing the meshing butt-joint parts of the adjacent lengthened bamboo chips in a staggered mode to obtain blank plates;

S3. placing the blank plates obtained in Step S2 in a hot press with positive and lateral pressing functions for positive and lateral hot pressing and gluing treatment to obtain the bamboo chip integrated materials;

when the adhesive is made of urea resin, the hot pressing and gluing treatment temperature is 90-100° C.;

when the adhesive is made of phenolic resin, the hot pressing and gluing treatment temperature is 130-140° C.;

for the hot pressing and gluing treatment, a positive pressure is 0.1-0.5 MPa, and a lateral pressure is 0.3-3.0 MPa.

Embodiment 1

In this embodiment, the surface of each bamboo chip unit 3 is provided with notches. The notches are of a punctiform shape, with a depth of 0.1-1 mm, a diameter of 0.2-2 mm, and a density of 1-3 notches/cm2.

Figure 2:
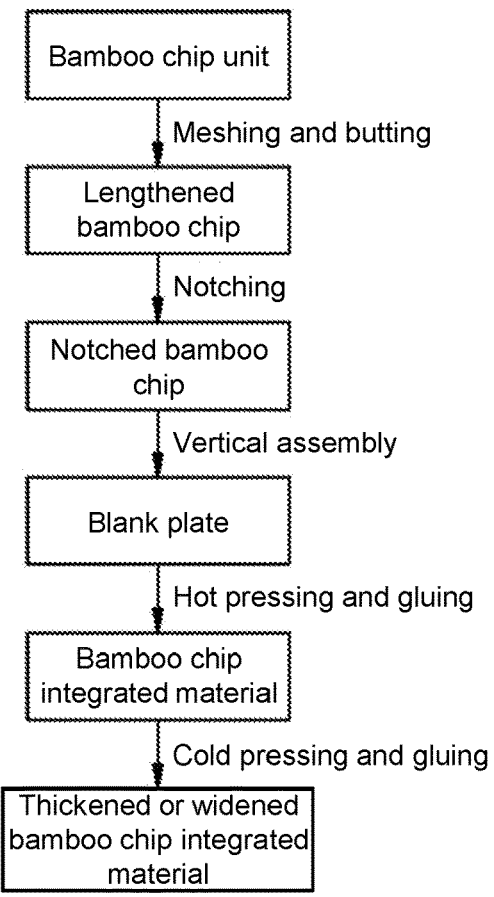
FIG. 2 illustrates a process flow in Embodiment 1 of the present invention.

As shown in FIG. 2, the present invention provides a manufacturing method of an infinite-arbitrary-length bamboo chip integrated material, comprising the following steps:

(1) preparation of the bamboo chip units 3: processing the bamboos into cuboid thin and small bamboo chips with four smooth sides by virtue of cut saw, dissection, initial milling, drying and finish milling, wherein each bamboo chip is 8 mm thick, 20 mm wide and 2 m long; drying the bamboo chips till the moisture content thereof is 10%, so as to obtain the bamboo chip units 3.

(2) meshing and butting of the bamboo chip units 3: respectively sawing the both ends of the bamboo chip units 3 into triangular sharp teeth 31 and corresponding grooves 32 thereof, coating the adhesive onto the sharp teeth 31 and the grooves 32, and continuously meshing and butting the heads and tails of the bamboo chip units 3 with equal width and equal thickness to obtain the lengthened bamboo chips through press-roll toothing mechanical equipment.

The sharp teeth 31 include large teeth 311 and a row of a plurality of small teeth 312, the large teeth 311 are arranged in the vicinity of one side edges of the bamboo chip units, the plurality of small teeth 312 are arranged to another side edges of the bamboo chip units 3 from the large teeth 311; each groove 32 includes large slots 321 and small slots 322 respectively matching the large teeth 311 and the small teeth 312.

In this embodiment, each sharp tooth 31 (or groove 32) has a length L of 10 mm, and each small tooth 312 (or small slot 322) has a bottom width W1 of 4 mm; each large slot 321 has a bottom width W2 of 8 mm; a width of each large tooth 311 (namely the width of the large slot 321) is greater than a width of the corresponding small tooth 312 (namely a width of each small slot 322); the teeth on the edge of each bamboo chip unit 3 is thicker than the teeth on the middle; when the subsequent meshing and butting is conducted, each bamboo chip unit 3 has a higher edge strength than a middle strength, thereby reducing the breaking risk of the sharp teeth 31 and lowering the rejection rate of the bamboo chip units 3 when the bonding strength can be ensured.

In this embodiment, there are four triangular small teeth 312 (and corresponding small slots 322) on an end plane of each bamboo chip unit 3.

Figure 3:
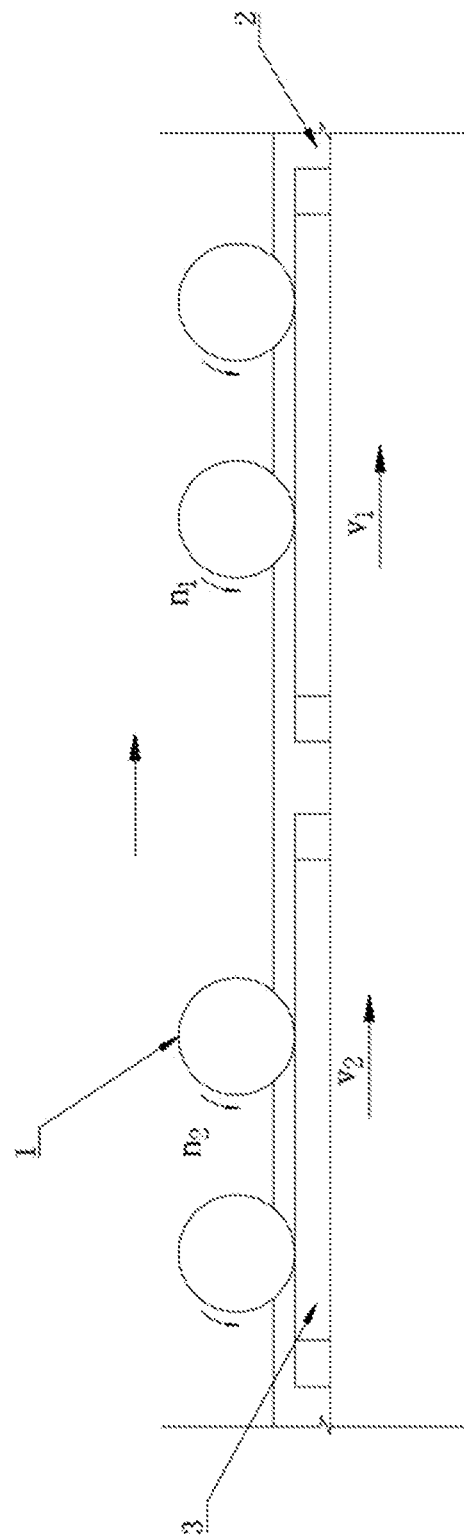
FIG. 3 illustrates a structure of roller meshed butting equipment in Embodiment 1 of the present invention.
Figure 4:
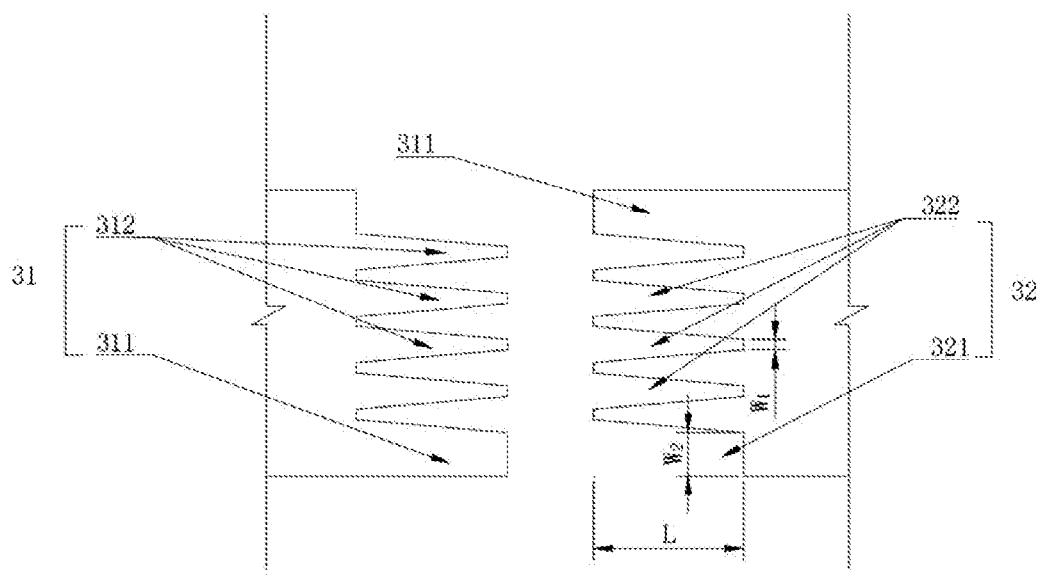
FIG. 4 illustrates a partial structure before bamboo chip units mesh and are butted in Embodiment 1 of the present invention.
Figure 5:
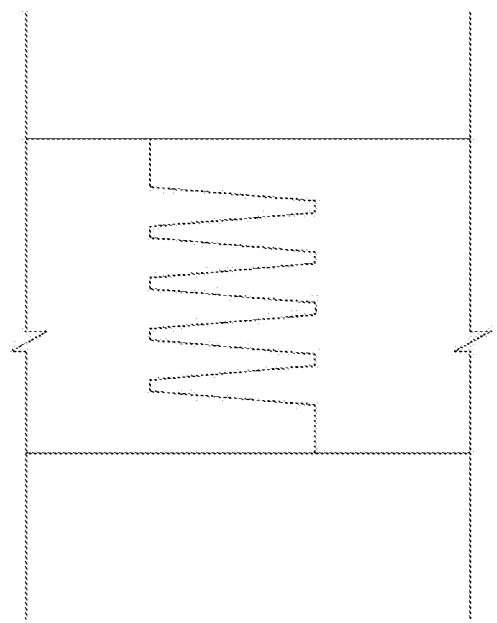
FIG. 5 illustrates a partial structure after bamboo chip units mesh and are butted in Embodiment 1 of the present invention.

As shown in FIG. 3, an arrow direction at the uppermost in FIG. 3 is a conveying direction of each bamboo chip unit 3. The roller meshed butting equipment includes horizontal grooves 2 and a plurality of rows of rollers 1, the horizontal grooves 2 are used for placing the bamboo chip units 3, an inner width of each horizontal groove 2 matches a width of the corresponding bamboo chip unit 3 and a width of each horizontal groove 2 is adjustable, and the rollers 1 are arranged over the horizontal grooves 2 to contact the bamboo chip units 3 and drive the bamboo chip units 3 to be conveyed forwards.

the continuous meshing and butting includes the following specific steps: placing the bamboo chip units 3 into the horizontal grooves 2 sequentially, wherein the sharp teeth 31 of the bamboo chip units 3 and the grooves 32 of the adjacent bamboo chip units 3 are arranged relatively; adjusting the revolving speed of the rollers 1 over the bamboo chip unit 3 so that the sharp teeth 31 of the bamboo chip unit 3 continuously mesh and are butted with the grooves 32 of another bamboo chip unit 3 in the bamboo chip unit conveying direction when a revolving speed n1 of the rollers 1 over the front bamboo chip unit 3 is lower than a revolving speed n2 of the roller 1 above the rear bamboo chip unit 3 and a conveying speed v1 of the front bamboo chip unit 3 is lower than a conveying speed v2 of the rear bamboo chip unit 3.

When the meshing and butting is conducted continuously, meshing and butting is conducted to realize infinite lengthening and any truncation according to the required length of the integrated material to be produced.

In this embodiment, each lengthened bamboo chip is formed by meshing and butting 10 bamboo chip units 2, with a length of 20 m.

Figure 6:
FIG. 6 illustrates a sketch of a notched bamboo chip in Embodiment 1 of the present invention.

(3) notching of the lengthened bamboo chips: using a thorn roller with thorns on a roller surface to make punctiform notching for the surfaces of the finger-joint lengthened bamboo chips to obtain the notched bamboo chips, wherein each notch has a depth of 0.5 mm, a diameter of 0.3 mm and a density of 2 notches/cm2, as shown in FIG. 6. before the hot pressing and gluing, the notching procedure is added to improve the surface roughness and the pore structure of each bamboo chip unit, thereby improving the gluing strength of the lengthened bamboo chips.

Figure 7:
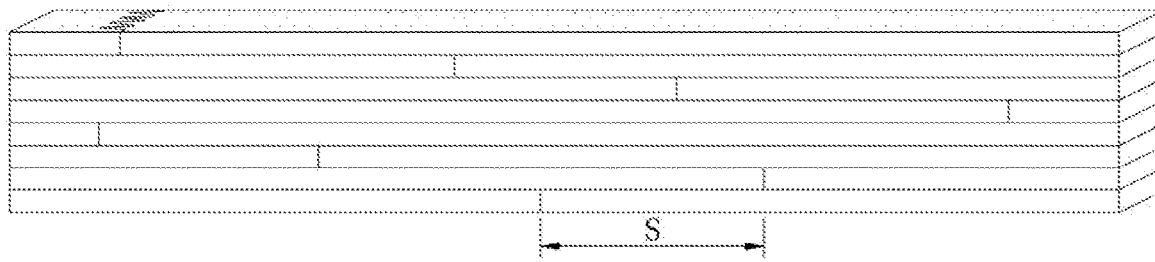
FIG. 7 illustrates a sketch of a blank plate in Embodiment 1 of the present invention.

(4) assembly of notched bamboo chips: applying a glue spreader to coat a phenolic resin adhesive (in other embodiments, a urea resin adhesive or other weather resistant adhesives with a high strength can be applied to obtaining the same or similar technical effects) on the surfaces (wide surfaces or rotation surfaces) of the notched bamboo chips, wherein the phenolic resin adhesive has a solid content of 28%; vertically assembling in a thickness direction of the notched bamboo chips, wherein the gluing surfaces of the notched bamboo units contact with each other; stopping assembly to obtain a blank plate when the required width of the bamboo chip integrated material reaches; as shown in FIG. 7, when the cut-off parts of the notched bamboo chip units calculated and adjusted, the meshing butt-joint parts are staggered with each other but not overlapped in the assembly, with a staggered spacing S thereof no less than 5 cm.

In this embodiment, eight notched bamboo chips are used for the assembly of the bamboo chip integrated materials.

(5) hot pressing and gluing treatment of the blank plate: feeding the assembled blank plate to the hot press with positive and lateral pressing functions for positive and lateral hot pressing, gluing and formation treatment, so as to obtain the hot pressed, glued and formed bamboo chip integrated materials, wherein the hot press temperature is 135° C., the time is 15 min, the positive pressure is 0.2 MPa, and the lateral pressure is 0.6 MPa.

In other embodiments, hot pressing temperature, time and pressure are determined according to the type of the used adhesive. The urea resin adhesive has a hot-pressing temperature of 90-100° C., the phenolic resin adhesive has a hot-pressing temperature of 130-140° C., and the hot pressing temperatures of other adhesives are determined according to their curing characteristics. The hot press shall have a length equivalent to the required bamboo plates to be produced, and the hot press without sufficiently length can be segmentally hot pressed and cured or added a certain device on the hot press.

In other embodiments, the positive pressure (chordwise pressure) is 0.1-0.5 MPa, the lateral pressure (radial pressure) is 0.3-3.0 MPa, and the hold pressure time is 5-20 min, all of which are determined as per the thickness of the target bamboo chip integrated material.

(6) Cold pressing and gluing treatment for the integrated material: planning or sanding the upper and lower surfaces of the plurality of bamboo chip integrated materials which are hot-pressed, glued and formed (in other embodiments, planning or sanding the sides), and then coating a resorcinol formaldehyde resin adhesive (in other embodiments, a modified resorcinol-formaldehyde resin adhesive, an isocyanate adhesive or other cold-cured phenolic resin adhesives can be applied to obtaining the same or similar technical effects) onto the surfaces of the bamboo chip integrated materials, feeding into a cold press for cold pressing and gluing treatment to obtain the thickened (or widened) bamboo chip integrated materials, wherein when the cold pressing is conducted, an ambient temperature is controlled to be 30° C., the positive pressure of the cold press is controlled at 0.5 MPa and the hold pressure time is 16 h (in other embodiments, the same or similar technical effects can be obtained when the hold pressure time is 10-24 h).

In this embodiment, the bamboo chip integrated materials hot pressed and glued are further subject to cold pressing and gluing treatment; in other embodiments, when a thickness of the target bamboo chip integrated material is smaller than a thickness value of the integrated material, it is not an extra-thick plate, so the further cold pressing and gluing treatment is not need.

In other embodiments, the bamboo chip integrated materials hot pressed and glued can be subject to the hot pressing and gluing treatment to obtain the thickened or widened bamboo chip integrated materials.

Upon the test, a mechanical strength of any one of all parts of the bamboo chip integrated materials prepared by this embodiment is identical, which complies with the van truck bottom plate requirements and standards (LY/T 1055-2002); a shear strength of a glue line is 20%-30% higher than the standard.

Embodiment 2

An infinite-arbitrary-length bamboo chip integrated material in this embodiment has the essentially same structure as that in Embodiment 1, and the difference therebetween lies in the following:

the surface of each bamboo chip unit 3 has no notches.

A manufacturing method of an infinite-arbitrary-length bamboo chip integrated material in this embodiment comprises the following steps:

(1) preparation of the bamboo chip units 3: processing the bamboos into cuboid thin and small bamboo chips with four smooth sides by virtue of cut saw, dissection, initial milling, drying and finish milling, wherein each bamboo chip is 15 mm thick, 30 mm wide and 2.6 m long; drying the bamboo chips till the moisture content thereof is 12%, so as to obtain the bamboo chip units 3.

(2) meshing and butting of the bamboo chip units 3: respectively sawing the both ends of the bamboo chip units 3 into triangular sharp teeth 31 and the corresponding grooves 32 thereof, coating the adhesive onto the sharp teeth 31 and the grooves 32, and meshing and butting the heads and tails of the bamboo chip units 3 with equal width and equal thickness to obtain the lengthened bamboo chips through press-roll toothing mechanical equipment.

In this embodiment, each sharp tooth 31 (or groove 32) has a length L of 10 mm, and each small tooth 312 (or small slot 322) has a bottom width W1 of 4 mm; The large slots 321 have a bottom width W2 of 8 mm; there are six triangular small teeth 312 (and corresponding small slots 322) on the end planes of the bamboo chip units 3.

The roller meshed butting equipment and the specific meshing and butting steps applied in this embodiment are same as those in Embodiment 1.

(3) assembly of lengthened bamboo chips: applying a glue spreader to coat a phenolic resin adhesive (in other embodiments, a urea resin adhesive or other weather resistant adhesives with a high strength can be applied to obtaining the same or similar technical effects) on the surfaces (wide surface or rotation surface) of the lengthened bamboo chips, wherein the phenolic resin adhesive has a solid content of 28%; vertically assembling in a thickness direction of the lengthened bamboo chips, wherein the gluing surfaces of the notched bamboo chips contact with each other; stopping assembly to obtain a blank plate when the required width of the bamboo chip integrated material reaches, wherein the meshing butt-joint parts are staggered with each other but not overlapped by calculating and adjusting the cut-off parts of the lengthened bamboo chips in the assembly, with a staggered spacing S thereof no less than 5 cm.

(4) hot pressing and gluing treatment for the blank plate: feeding the assembled blank plate to the hot press with positive and lateral pressing device for hot pressing, gluing and formation treatment, so as to obtain the hot pressed, glued and formed bamboo chip integrated materials, wherein the hot press temperature is 135° C., the time is 15 min, the positive pressure is 0.2 MPa, and the lateral pressure is 0.6 MPa.

(5) cold pressing and gluing treatment for the integrated materials: planning or sanding the upper and lower surfaces (in other embodiments, planning or sanding the sides) of the bamboo chip integrated materials hot-pressed, glued and formed, and then coating a resorcinol formaldehyde resin adhesive (in other embodiments, a modified resorcinol-formaldehyde resin adhesive, an isocyanate adhesive or other cold-cured phenolic resin adhesives can be applied to obtaining the same or similar technical effects) onto the surfaces of the bamboo chip integrated materials, feeding into a cold press for cold pressing and gluing treatment to obtain the thickened (or widened) bamboo chip integrated materials, wherein when the cold pressing is conducted, an ambient temperature is controlled to be 30° C., the positive pressure of the cold press is controlled at 0.5 MPa and the hold pressure time is 16 h.

Upon the test, the bamboo chip integrated materials prepared by this embodiment conform to the requirements and standards of the van truck bottom plate (LY/T 1055-2002).

Embodiment 3

An infinite-arbitrary-length bamboo chip integrated material of this embodiment is glued by a plurality of bamboo chip integrated materials in a width direction, and the bamboo chip units 3 between the adjacent bamboo chip integrated materials are arranged in a staggered mode. In this embodiment, the bamboo chip integrated materials of Embodiments 1 and 2 are taken according to the actual needs, and then coated with the adhesive, and finally are subject to cold pressing or hot pressing and gluing treatment in a width direction of the bamboo chip integrated materials to obtain the widened bamboo chip integrated materials.

In other embodiments, the bamboo chip units 3 of different thicknesses can be prepared; the bamboo chip units 3 with the same thickness are respectively prepared into a plurality of bamboo chip integrated materials. On account that different numbers of bamboo chip units 3 with different thicknesses are required when the bamboo chip integrated materials with the same thickness are prepared, the number of bamboo chip units 3 in the bamboo chip integrated materials is adjusted to prepare the bamboo chip integrated materials with the equal thickness according to the actual needs.

Figure 8:
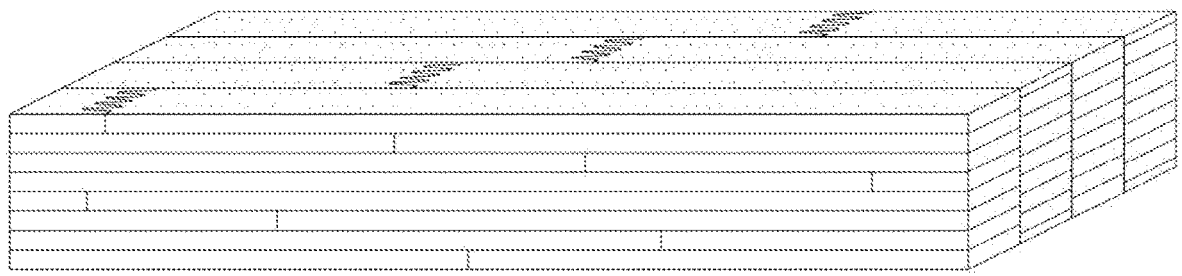
FIG. 8 illustrates a sketch of a widened bamboo chip integrated material in Embodiment 3 of the present invention.

The plurality of bamboo chip integrated materials are coated with the adhesive, and the widened bamboo chip integrated materials are glued in the width direction of the bamboo chip integrated materials. The meshing butt-joint parts are arranged in a staggered mode between the adjacent bamboo chip integrated materials. Moreover, although the original bamboo chip units 3 have different thicknesses in all bamboo chip integrated materials, the bamboo chip units 3 of the adjacent bamboo chip integrated materials are arranged in a staggered mode in the width direction of the bamboo chip integrated materials. As shown in FIG. 8, such arrangement can improve the strength of the final bamboo chip integrated materials.

Although the present invention has been disclosed as above in the preferred embodiments, they are not intended to limit the present invention. Any person skilled in the art, without departing from the scope of the technical solution of the present invention, is capable of taking advantage of the above-described technical content to make a plurality of possible variations and modifications of the technical solution, or equivalent embodiments with equivalent changes. Therefore, all the contents without departing from the technical solution of the present invention, based on any simple modification, equivalent variations and modifications made by the technical spirit of the present invention for the above embodiments, would be incorporated in the protection range of the technical solution of the present invention.

What is claimed is:

1. A method for manufacturing a bamboo chip integrated material, comprising:
S1. processing bamboos into a plurality of bamboo chip units (3), providing sharp teeth (31) and grooves (32) at both ends of each bamboo chip unit (3), continuously meshing and butting the plurality of bamboo chip units (3), and cutting off the bamboo chip units (3) that reach a preset length to obtain lengthened bamboo chips according to needs;
wherein in the step S1, processing the bamboos into the bamboo chip units (3) comprises: using a cut saw to dissect the bamboos, performing an initial milling step, drying, and performing a finishing milling step on the bamboos;
in the step S1, continuously meshing and butting the bamboo chip units using roller meshed butting equipment comprising horizontal grooves (2) and a plurality of rows of rollers (1), the horizontal grooves (2) are used for placing the bamboo chip units (3), a width of each horizontal groove (2) is adjusted to match a width of the bamboo chip unit (3) inserted into said horizontal groove, and the rollers (1) are arranged over the horizontal grooves (2) to contact the bamboo chip units (3) and drive the bamboo chip units (3) to convey the bamboo chip units forward;
wherein the plurality of rows of rollers in the roller mesh butting equipment comprise front rollers and rear rollers and the continuously meshing and butting includes the following specific steps: placing the bamboo chip units (3) into the horizontal grooves (2) sequentially, wherein the sharp teeth (31) of a front bamboo chip unit and the grooves of a rear bamboo chip unit are aligned; adjusting a revolving speed n1 of the front rollers over the front bamboo chip unit to be lower than a revolving speed n2 of the rear rollers over the rear bamboo chip unit to implement a conveying speed v1 of the front bamboo chip unit that is lower than a conveying speed v2 of the rear bamboo chip unit in order to connect the sharp teeth of the front bamboo chip unit into the grooves of the rear bamboo chip unit, thus forming a meshing butt-joint part between the front and rear bamboo chip units;
S2. taking the plurality of lengthened bamboo chips obtained in step S1, conducting vertical assembly processing in a thickness direction of the lengthened bamboo chips, which have an adhesive applied to a surface thereof prior to joining, and after assembly of the lengthened bamboo chips in a stack, the meshing butt-joint parts in each of the adjacent lengthened bamboo chips in the stack are staggered relative to each other to obtain blank plates;
S3. placing the blank plates obtained in Step S2 in a hot press with positive and lateral pressing functions for positive and lateral hot pressing and gluing treatment to obtain the bamboo chip integrated material;
wherein the adhesive is either urea resin or phenolic resin, and
when the adhesive is resin, the hot pressing and gluing treatment temperature is 90° C. to 100° C.;
when the adhesive is phenolic resin, the hot pressing and gluing treatment temperature is 130° C. to 140° C.;
for the hot pressing and gluing treatment, a positive pressure is 0.1-0.5 M Pa, and a lateral pressure is 0.3M Pa to 3.0 M Pa.

2. The method for manufacturing the bamboo chip integrated material according to claim 1, wherein in the step S3, after the hot pressing and gluing treatment, further comprising the following steps: planing a plurality of bamboo chip integrated materials, placing into a cold press for cold pressing and gluing treatment after the surfaces of the plurality of bamboo chip integrated materials are coated with a cold-cured adhesive to form the plurality of bamboo chip integrated materials into a widened or thickened bamboo chip integrated material.

3. The method for manufacturing the bamboo chip integrated material according to claim 2, wherein the cold-cured adhesive is made of one of resorcinol formaldehyde resin, modified resorcinol-formaldehyde resin or isocyanate; when the cold pressing and gluing treatment is conducted, the temperature is room temperature, the positive pressure is 0.2 MPa to 2 MPa, and the lateral pressure is 0.3 MPa to 2.0 MPa.

4. The method for manufacturing the bamboo chip integrated material according to claim 1, wherein in the step S2, the surfaces of the lengthened bamboo chips are notched before the adhesive is coated by thorn rollers with thorns on the roller surfaces.

5. The method for manufacturing the bamboo chip integrated material according to claim 2, wherein in the step S2, the surfaces of the lengthened bamboo chips are notched before the adhesive is coated by thorn rollers with thorns on the roller surfaces.

6. The method for manufacturing the bamboo chip integrated material according to claim 3, wherein in the step S2, the surfaces of the lengthened bamboo chips are notched before the adhesive is coated by thorn rollers with thorns on the roller surfaces.

* * * * *